(12) United States Patent
Theisen et al.

(10) Patent No.: US 10,337,722 B1
(45) Date of Patent: Jul. 2, 2019

(54) MODULAR SHELF UNIT

(71) Applicant: Target Brands, Inc., Minneapolis, MN (US)

(72) Inventors: Jennifer A. Theisen, Crystal, MN (US); William Y. Stafford, Minnestrista, MN (US); Benjamin Weshler, New York, NY (US); Anthony DeMayo, Smithtown, NY (US); Yin-Chie Huang, Great Neck, NY (US)

(73) Assignee: Target Brands, Inc., Minneapolis, MN (US)

( * ) Notice: Subject to any disclaimer, the term of this patent is extended or adjusted under 35 U.S.C. 154(b) by 71 days.

(21) Appl. No.: 15/846,917

(22) Filed: Dec. 19, 2017

(51) Int. Cl.
| | |
|---|---|
| *A47B 23/06* | (2006.01) |
| *F21V 33/00* | (2006.01) |
| *F16B 1/00* | (2006.01) |
| *A47F 5/12* | (2006.01) |
| *F21V 23/06* | (2006.01) |
| *A47F 5/00* | (2006.01) |
| *F21W 131/301* | (2006.01) |

(52) U.S. Cl.
CPC ........ *F21V 33/0012* (2013.01); *A47F 5/0006* (2013.01); *A47F 5/12* (2013.01); *F16B 1/00* (2013.01); *F21V 23/06* (2013.01); *F16B 2001/0035* (2013.01); *F21W 2131/301* (2013.01)

(58) Field of Classification Search
CPC .... F21V 33/0012; F21V 23/06; A47F 5/0006; A47F 5/00; A47F 5/12; A47F 5/0018; A47F 5/0037; F16B 1/00; F16B 2001/0035; F21W 2131/301
See application file for complete search history.

(56) References Cited

U.S. PATENT DOCUMENTS

| | | | |
|---|---|---|---|
| 4,217,008 A | * | 8/1980 | Wright ............... B42F 15/0058 312/184 |
| 4,762,235 A | | 8/1988 | Howard et al. |
| 4,919,280 A | | 4/1990 | Phillips |
| 5,388,032 A | * | 2/1995 | Gill .................... A47B 21/0314 361/679.01 |
| 5,439,123 A | | 8/1995 | Nook |
| 5,553,724 A | * | 9/1996 | Moher ................. A47F 5/0087 211/150 |
| 5,695,261 A | | 12/1997 | Slesinger et al. |
| 6,070,741 A | | 6/2000 | Bachman et al. |
| 6,585,118 B2 | | 7/2003 | Kellogg |
| 7,308,987 B2 | | 12/2007 | Richardson et al. |
| 7,401,429 B1 | | 7/2008 | Kvortek |

(Continued)

*Primary Examiner* — Ali Alavi
(74) *Attorney, Agent, or Firm* — Leanne Taveggia Farrell; Westman, Champlin & Koehler, P.A.

(57) ABSTRACT

A modular shelf unit includes a shelf frame having a front, a back and right and left sides and a front panel rotatably coupled to the front of the shelf frame. The front panel is configured to rotate about a rotational axis located proximate to a bottom edge of the front of the shelf frame. The front panel includes at least one holder configured to hold sheet material and a plurality of lights located behind the at least one holder to illuminate the sheet material. When the front panel is configured into a rotatably opened position, the plurality of lights are turned off. When the front panel is configured into a rotatably closed position, the plurality of lights are turned on.

20 Claims, 16 Drawing Sheets

(56) References Cited

U.S. PATENT DOCUMENTS

| | | | |
|---|---|---|---|
| 7,571,823 B2 | 8/2009 | Richardson et al. | |
| 7,762,410 B2 | 7/2010 | Colin et al. | |
| 8,419,205 B1 * | 4/2013 | Schmuckle | F21V 33/006 |
| | | | 362/145 |
| 8,602,230 B2 | 12/2013 | Bergdoll et al. | |
| 8,776,465 B2 * | 7/2014 | Murphy | E04F 19/00 |
| | | | 52/309.4 |
| 8,920,898 B2 * | 12/2014 | Spurgeon | B44C 3/10 |
| | | | 362/145 |
| 8,925,745 B2 | 1/2015 | Theisen et al. | |
| 8,985,352 B2 | 3/2015 | Bergdoll et al. | |
| 9,004,714 B2 * | 4/2015 | Hartman | F21V 21/02 |
| | | | 362/145 |
| 9,157,210 B2 * | 10/2015 | Patti | E02D 17/205 |
| 9,175,840 B2 * | 11/2015 | Patti | F21V 27/02 |
| 9,237,803 B2 | 1/2016 | Kassanoff et al. | |
| 9,245,464 B2 | 1/2016 | Theisen et al. | |
| 9,384,684 B2 | 7/2016 | Theisen et al. | |
| 9,492,012 B2 | 11/2016 | Morgan et al. | |
| 2005/0224431 A1 | 10/2005 | Campello et al. | |
| 2008/0006595 A1 | 1/2008 | Black | |
| 2009/0039040 A1 | 2/2009 | Johnson et al. | |
| 2012/0228242 A1 * | 9/2012 | Vogler | A47F 1/06 |
| | | | 211/4 |
| 2015/0173528 A1 | 6/2015 | Hester-Redmond | |
| 2015/0173529 A1 | 6/2015 | Hester-Redmond | |
| 2018/0160825 A1 * | 6/2018 | Abel | A47F 5/116 |

* cited by examiner

MODULAR SHELF UNIT

BACKGROUND

Retail stores use a variety of display fixtures to present products to customers for purchase. These display fixtures can support the product, indicate the product price, include signage for highlighting the product and/or include structures that hold samples of the product. Exemplary display structures include shelves, trays, racks, peg hooks and other similar structures.

The discussion above is merely provided for general background information and is not intended to be used as an aid in determining the scope of the claimed subject matter.

SUMMARY

A modular shelf unit includes a shelf frame having a front, a back and right and left sides and a front panel rotatably coupled to the front of the shelf frame. The front panel is configured to rotate about a rotational axis located proximate to a bottom edge of the front of the shelf frame. The front panel includes at least one holder configured to hold sheet material and a plurality of lights located behind the at least one holder to illuminate the sheet material. When the front panel is configured into a rotatably opened position, the plurality of lights are turned off. When the front panel is configured into a rotatably closed position, the plurality of lights are turned on.

A modular shelf unit includes a shelf frame having spaced apart side frame members, a front frame member connecting front ends of the side frame members and a back frame member connecting back ends of the side frame members. The shelf frame includes a receiving feature including a hang bar that extends along at least a portion of a bottom, interior of the back frame member and configured to receive a lower modular display component. The shelf frame includes at least another receiving feature configured to receive an upper modular display component.

A method of applying a graphic or price label to a modular shelf unit includes providing a shelf frame including a front, a back and right and left sides and a front panel rotatably coupled to the front of the shelf frame. The front panel includes at least one holder configured to hold sheet material and lights located behind the at least one holder to illuminate the sheet material. The front panel of the shelf frame is rotated about a rotational axis located proximate to a bottom edge of the front of the shelf frame to open the front panel. The lights are turned off when the front panel is rotated away from the front of the shelf frame. In this position, graphics or price labels are inserted in the at least one holder. The front panel of the shelf frame is rotated to close the front panel and the plurality of lights are turned on.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

The modular shelf units described in detail below are display structures that when mounted to a display fixture display retail products. Each modular shelf unit includes a shelf frame that may be made of metal and a front panel that is rotatably coupled to a front member of the shelf frame. Each modular shelf unit is configured to receive a select one or more of various modular display components and aids in the display of retail products, such as beauty supplies. Exemplary beauty supplies include nail polish, lipsticks, lip glosses, eye shadows, rouge, bronzers, make-up bases, powders, lotions, brushes, pencils, etc. Each rotatable front panel of each shelf frame is rotated open to change and insert price labels and marketing signage.

More specifically, each shelf frame includes frame members that retain the various modular display components. Such modular display components include, but are not limited to, one or more peg hooks, a full or half shelf liner, one or more pusher trays and one or more cubbies. To receive these modular display components, each shelf frame includes one or more receiving features. For example, a receiving feature may be located on the lower areas of the shelf frame and receive lower modular display components or a receiving feature may be located on the upper areas of the shelf frame and receive upper modular display components. An exemplary receiving feature that receives lower modular display components includes an integral hang bar. An exemplary receiving feature that receives upper modular display components includes an integral upper facing rear channel and an integral upper facing front channel. In this way, peg hooks may be positioned on the lower receiving feature, such as the hang bar, simultaneously with any of the shelf liners, pusher trays and cubbies, which are received by upper receiving features, such as upper facing rear channel and upper facing front channel.

Figure 1:
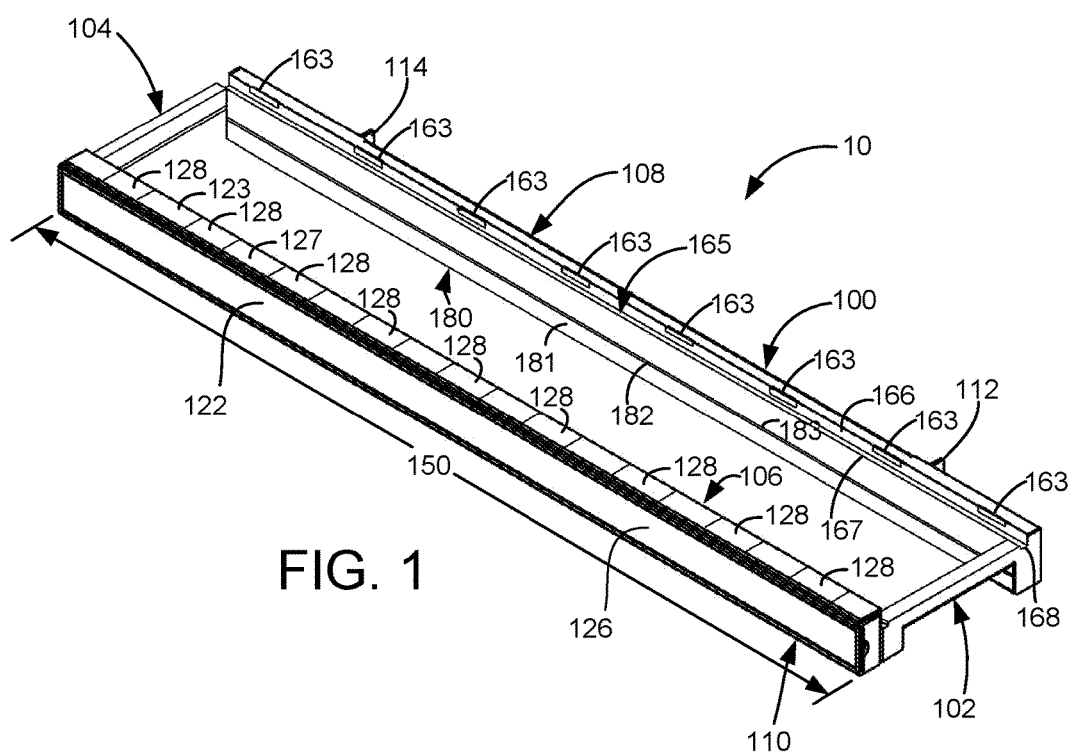
FIG. 1 is a perspective view of a modular shelf unit having a closed front panel according to an embodiment.
Figure 2:
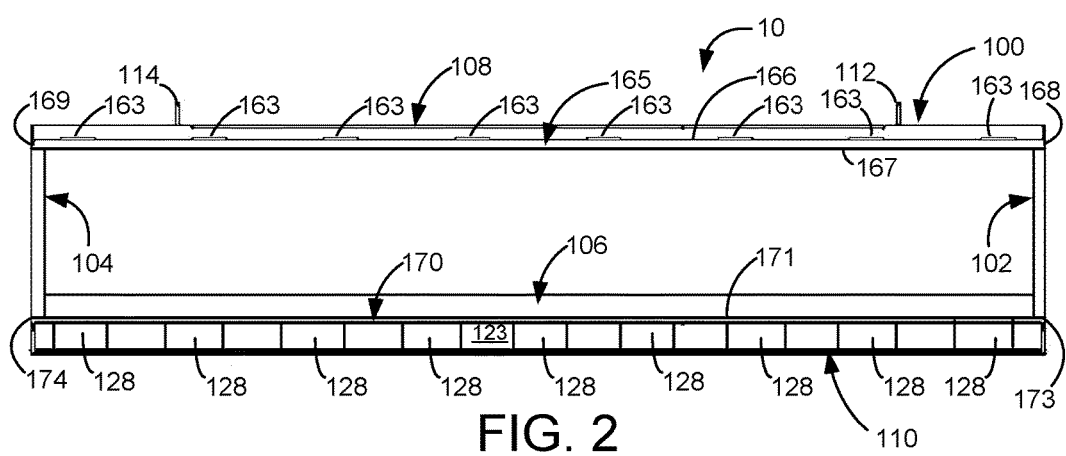
FIG. 2 is a top view of FIG. 1.
Figure 3:
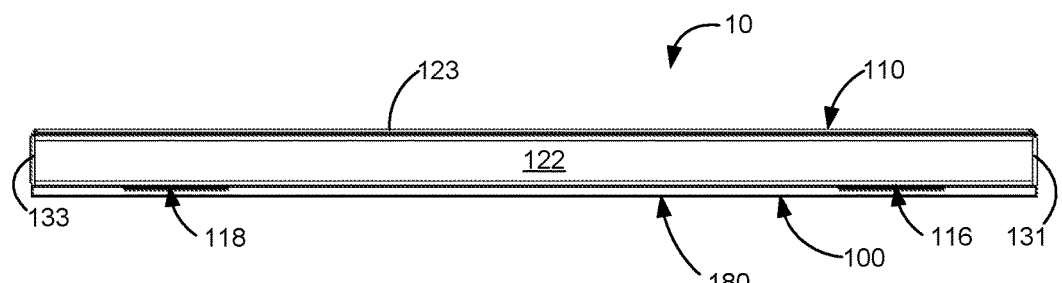
FIG. 3 is a front view of FIG. 1.
Figure 4:
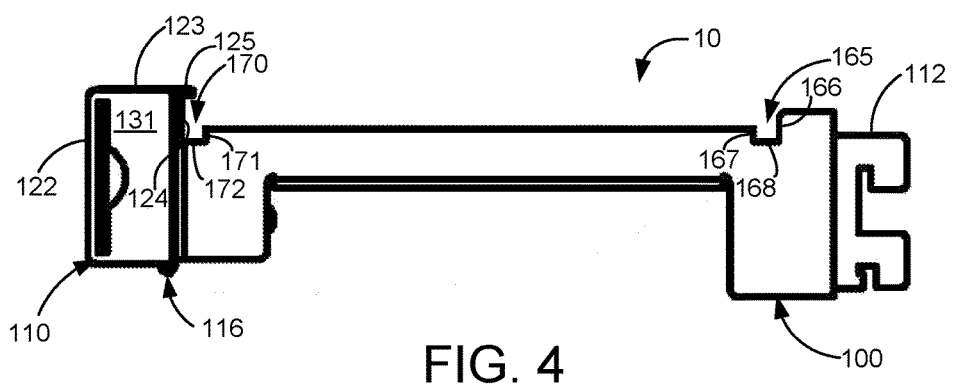
FIG. 4 is an enlarged right side view of FIG. 1.
Figure 5:
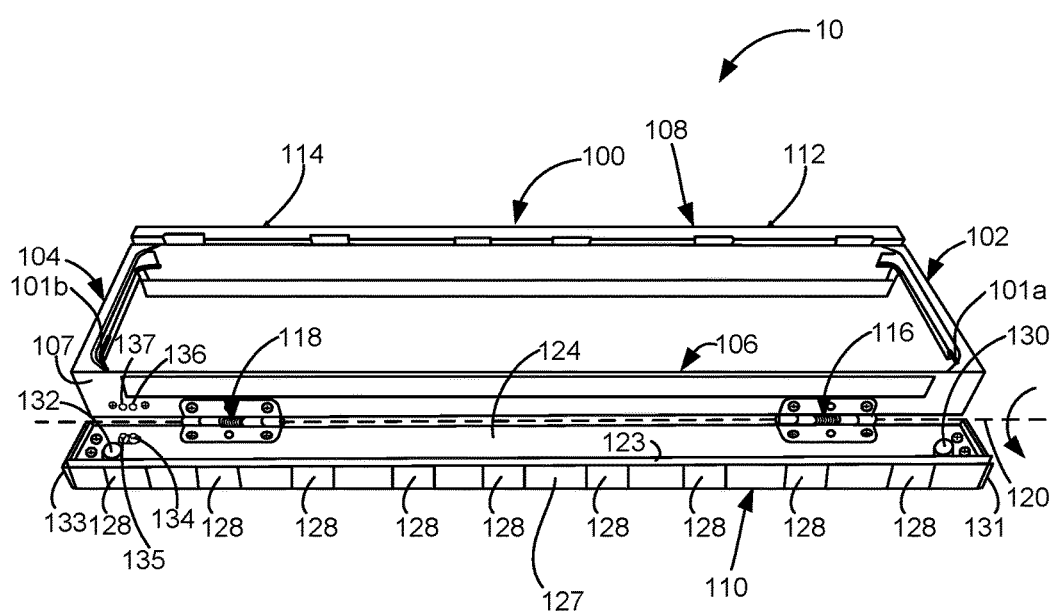
FIG. 5 is a perspective view of the modular shelf unit of FIG. 1 with the front panel opened.

FIG. 1 is a perspective view of a modular shelf unit 10 according to an embodiment. FIG. 2 is a top view, FIG. 3 is a front view and FIG. 4 is an enlarged right side view of FIG. 1. In FIG. 1, modular shelf unit 10 includes shelf frame 100 and front panel 110. Shelf frame 100 has a pair of spaced apart right and left side frame members 102 and 104, a front frame member 106, a spaced apart back frame member 108 and a pair of brackets 112 and 114 mounted to a back of back frame member 108. Front panel 110 is rotatably mounted to front frame member 106 of shelf frame 110. FIGS. 1-4 illustrate front panel 110 configured in a closed position. FIG. 5 is a perspective view of modular shelf unit 10 of FIG. 1 with front panel 110 configured in a rotatably opened position relative to shelf frame 100. Front panel 110 is mounted to front frame member 106 by at least two hinges 116 and 118. Hinges 116 and 118 rotate front panel relative to front frame member 106 about a rotational axis 120 that is proximate a bottom of front frame member 106.

Front panel 110 includes a front exterior side 122, an upper side 123 and a back interior side 124. Front exterior side 122 includes an elongated holder 126 for holding at least one sheet material including a graphic. Upper side 123 includes another elongated holder 127 for holding sheet material including price labels 128. Price labels 128 are inserted into and placed along label holder 127 so that they are configured to align with products that are displayed on the various modular display components not illustrated in FIGS. 1 and 2. Back interior side 124 (FIG. 5) supports different types of hardware.

In one embodiment, back interior side 124 includes a first magnet 130 located near the right end 131 of front panel 110 and a second magnet 132 located near the left end 133 of front panel 110. Magnets 130 and 132 provide a secondary attachment of front panel 110 to front frame member 106. In other words, when front panel 110 is rotated back to a rotatably closed position as shown in FIG. 1, magnets 130 and 132 secure the upper part of front panel 110 against the metal material of outwardly facing surface 107 of front frame member 106.

In another embodiment, shelf frame 100 is electrically coupled to a power source for example by electrically conductive wires (see FIG. 5 illustrating wires 101a and 101b extending between front frame member 106 and back frame member 108). Back interior side 124 of front panel 110 includes a pair of electrically conductive prongs 134 and 135. When front panel 110 is in a rotatably closed position as shown in FIG. 1, electrically conductive prongs 134 and 135 mate with and are electrically coupled to electrical contacts 136 and 137 located on outwardly facing surface 107 of front frame member 106. In this closed configuration, a plurality of lights, such as white LEDs (not shown in FIG. 5) that are located behind holders 126 and 127, are powered on and emit light. The light is emitted through the sheet material in holder 126 on front exterior side 122 and emitted through sheet material, such as price labels 128, in holder 127 on upper side 123 of front panel 110. When electrically conductive prongs 134 and 135 are separated or decoupled from electrical contacts 136 and 137 and therefore magnets 130 and 132 are separated from outwardly facing surface 107 of front frame member 106, the power to the plurality of lights is shut off and front panel 110 goes dark. By turning off the power, a team member may more easily make changes to the graphics in the graphic holder 126 and price labels 128 in the price label holder without light brightness becoming an issue.

Figure 6:
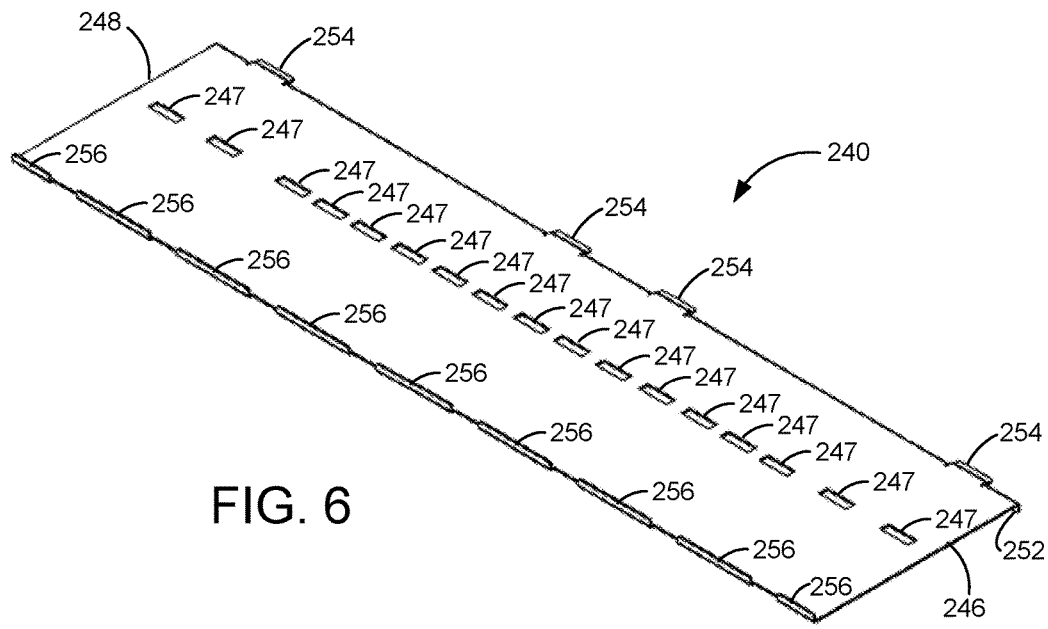
FIG. 6 is a perspective view of a shelf liner according to an embodiment.
Figure 7:
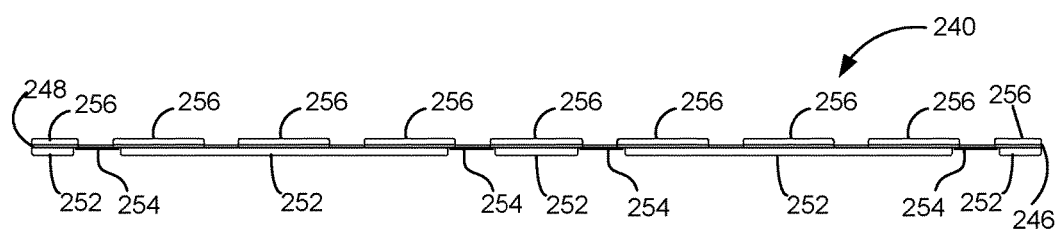
FIG. 7 is a front view of the shelf liner of FIG. 6.
Figure 8:
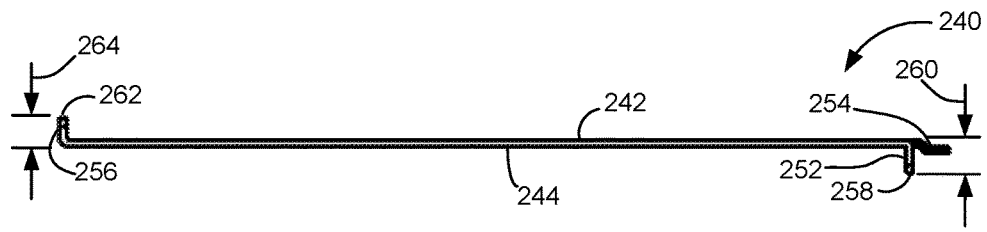
FIG. 8 is an enlarged right side view of the shelf liner of FIG. 6.
Figure 9:
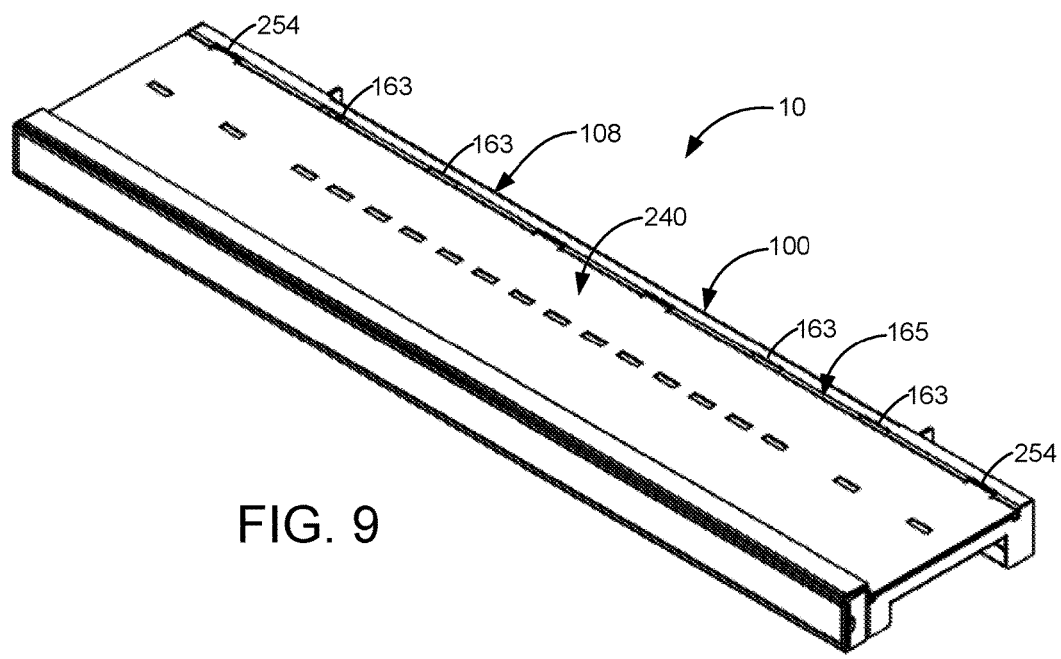
FIG. 9 is a perspective view of a modular shelf unit including the shelf frame of FIG. 1 with the shelf liner of FIG. 6 according to an embodiment.

FIG. 6 is a perspective view of a full shelf liner 240 according to an embodiment. FIG. 7 is a front view and FIG. 8 is an enlarged right side view of a full shelf liner 240. Full shelf liner 240 is one of the various modular display components and more specifically an upper modular display component that can be received by upper receiving features of shelf frame 100 to form a modular shelf unit. In particular, FIG. 9 is a perspective view of a modular shelf unit 10 including full shelf liner 240 mounted to shelf frame 100 according to an embodiment. Full shelf liner 240 is configured to hold products for display with the support of shelf frame 100.

Full shelf liner 240 includes a top surface 242, a bottom surface 244, a right side edge 246, a left side edge 248 and a length 250 that extends from right side edge 246 to left side edge 248. The back edge of shelf liner 240 includes downwardly depending lips 252 and outwardly extending flanges 254 that are interspersed with each other along the back edge for length 250. The front edge of shelf liner 240 includes a plurality of spaced apart upwardly depending lips 256 that are spaced apart from each other along length 250. As illustrated in FIG. 8, all downwardly depending lips 252 extend from top surface 242 to a terminating edge 258 for a distance 260. As also illustrated in FIG. 8, all upwardly depending lips 256 extend from bottom surface 244 to a terminating edge 262 for a distance 264.

With reference to FIGS. 1-2 and 4, shelf frame 100 of modular shelf unit 10 includes one or more receiving features, and in particular one or more upper receiving features. One type of receiving feature includes an upper facing rear channel 165 that is defined by a rear wall 166, a front wall 167, an open right side 168 and an open left side 169. Upper facing rear channel 165 extends for an entirety of width 150 of shelf frame 100 and therefore open right side 168 intersects with the right side of shelf frame 100 and the open left side 169 intersects with the left side of shelf frame 100. Another type of receiving feature includes a plurality of notches 163 that are spaced apart along rear wall 166 of upper facing rear channel 165 of back frame member 108. Yet another type of receiving feature includes an upper facing front channel 170 that is defined by a rear wall 171, a front wall 172, an open right side 173 and an open left side 174. Upper facing front channel 170 also extends for an entirety of width 150 of shelf frame 100.

Figure 10:
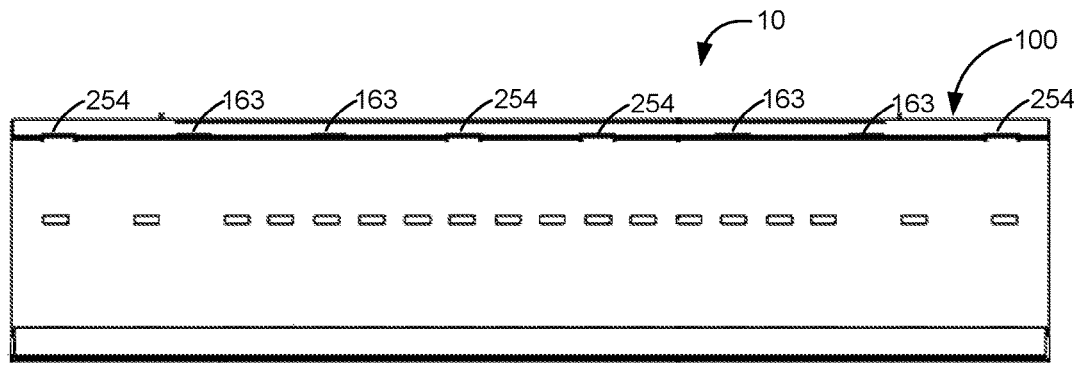
FIG. 10 is a top view of FIG. 9.
Figure 11:
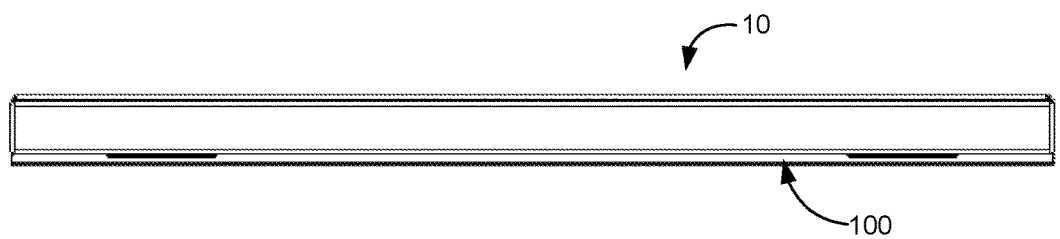
FIG. 11 is a front view of FIG. 9.
Figure 12:
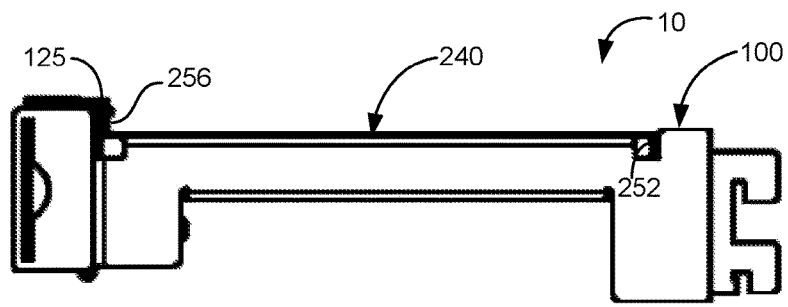
FIG. 12 is an enlarged right side view of FIG. 9.

As previously mentioned, FIG. 9 is a perspective view of modular shelf unit 10 including full shelf liner 240 mounted to shelf frame 100 according to an embodiment. FIG. 10 is a top view, FIG. 11 is a front view and FIG. 12 is an enlarged right side view of FIG. 9. In FIGS. 9-12, full shelf liner 240 is mounted to shelf frame 100 as follows. Each of the four outwardly extending flanges 254 located along the back edge of shelf liner 240 are received by four of the notches 163 located along back wall 166 of back frame member 108. Further, each of the downwardly depending lips 252 is positioned within upper facing rear channel 165 such that terminating edge 258 of each downwardly depending lip 252 is in engagement with the bottom of upper facing rear channel 165. Still further, each of the upwardly depending lips 256 is positioned under the cantilevered wall 125 (shown best in FIG. 4) of front frame member 106.

Figure 13:
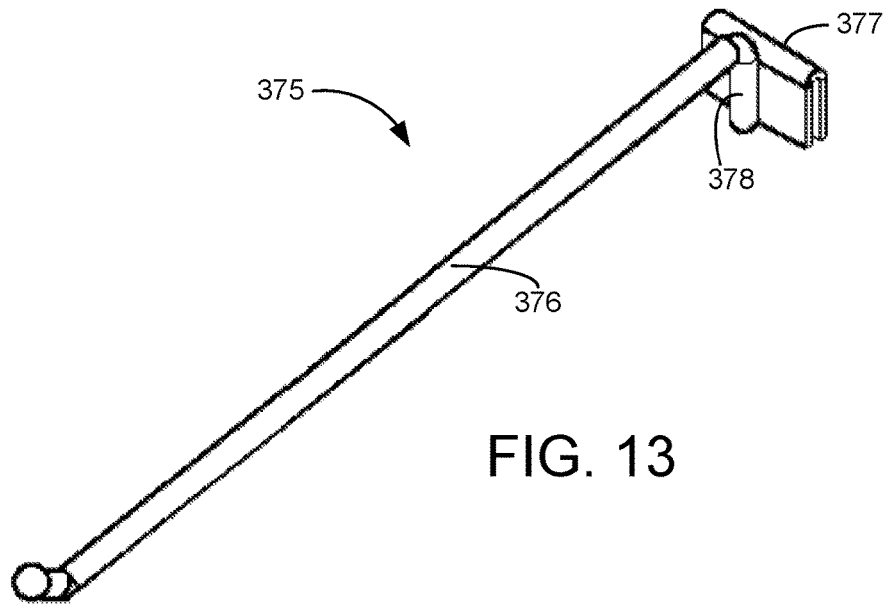
FIG. 13 is a perspective view of a peg hook according to an embodiment.
Figure 14:
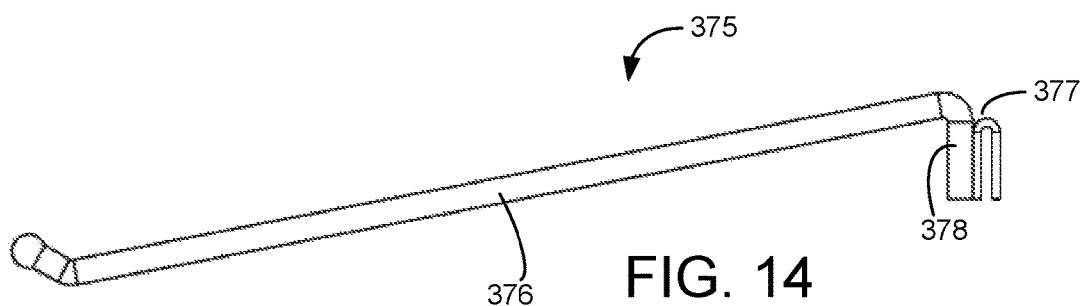
FIG. 14 is a right side view of the peg hook of FIG. 13.
Figure 15:
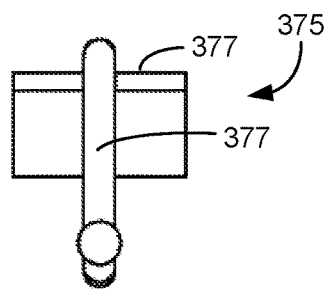
FIG. 15 is a front view of the peg hook of FIG. 13.
Figure 16:
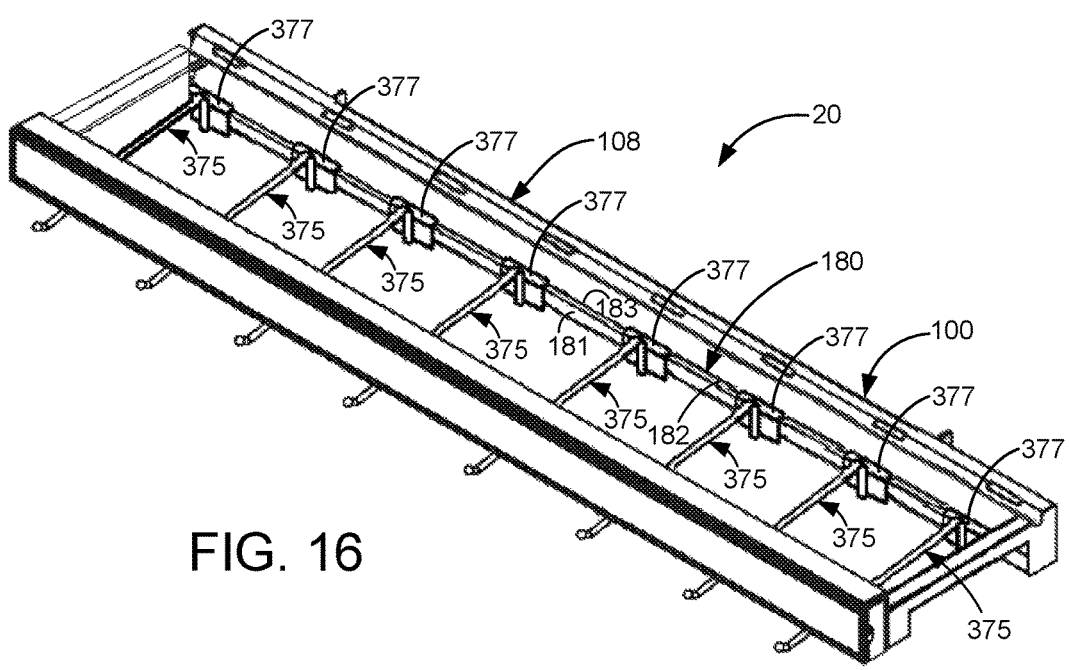
FIG. 16 is perspective view of a modular shelf unit including the shelf frame of FIG. 1 with a plurality of peg hooks of FIG. 13 according to an embodiment.

FIG. 13 is a perspective view of a peg hook 375 according to an embodiment. FIG. 14 is a right side view and FIG. 15 is front view of peg hook 375. Peg hook 375 is one of the various modular display components and more specifically a lower modular display component that can be received by a lower receiving feature of shelf frame 100. In particular, FIG. 16 is a perspective view of a modular shelf unit 20 including a plurality of peg hooks 375 mounted to shelf frame 100 according to an embodiment. Each peg hook 375 is configured to support products for display on stem 376. Peg hook 375 also includes a bracket 377 mounted to the downwardly depending portion 378 of stem 376. Bracket 377 is configured to support, hold or bear the weight of peg hook 375 and the products that stem 376 of peg hook 375 displays.

With reference to FIG. 1, back frame member 108 of shelf frame 100 includes yet another receiving feature, and in particular a lower receiving feature: a hang bar 180. Hang bar 180 is located below upper facing rear channel 165 and is defined by a front wall 181, an upward facing wall 182 and a back wall 183. Hang bar 180 extends just short of an entirety of width 150 of shelf frame 100. Hang bar 180 is located between the interiors of right side frame member 102 and left side frame member 104.

Figure 17:
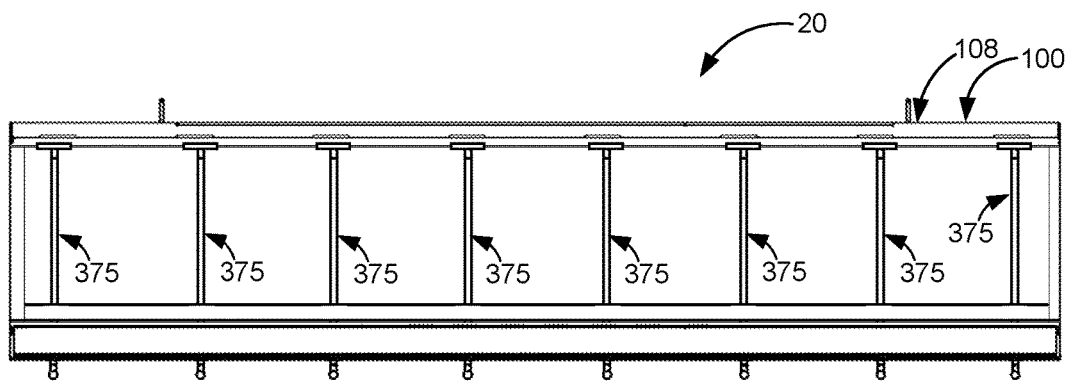
FIG. 17 is a top view of FIG. 16.
Figure 18:
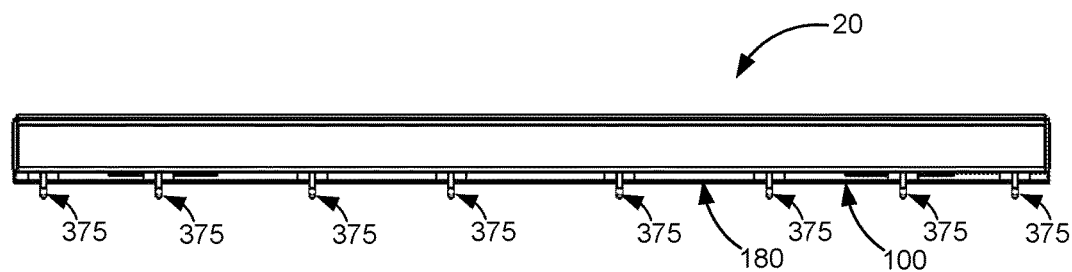
FIG. 18 is a front view of FIG. 16.
Figure 19:
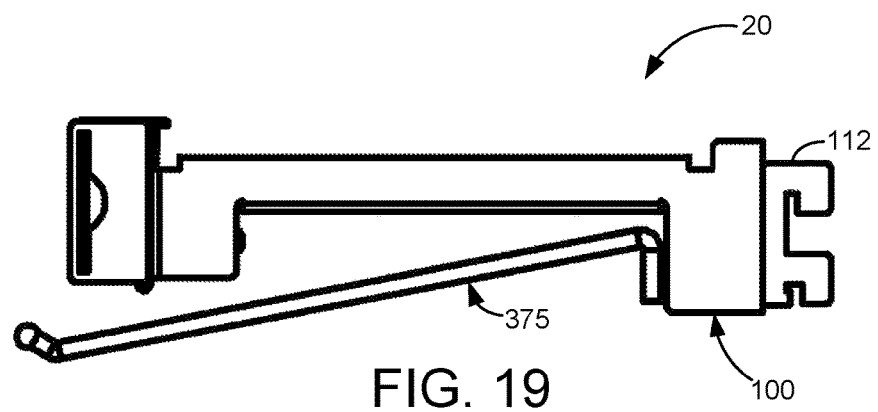
FIG. 19 is an enlarged right side view of FIG. 16.

As previously mentioned, FIG. 16 is a perspective view of modular shelf unit 20 including plurality of peg hooks 375 mounted to shelf frame 100 according to an embodiment. FIG. 17 is a top view, FIG. 18 is a front view and FIG. 19 is an enlarged right side view of FIG. 16. In FIGS. 16-19, peg hooks 375 are mounted to shelf frame 100 as follows. Each bracket 377 of each peg hook 375 is slid onto hang bar 180 at spaced apart distances. In particular, an interior front of bracket 377 is in contact with front wall 181 of hang bar 180, an interior back of bracket 377 is in contact with back wall 183 of hang bar 180 and an interior top of bracket 377 is in contact with upward facing wall 182 of hang bar 180. In this way, each stem 376 of each peg hook 375 extends forward from hang bar 180 and protrudes from the bottom of shelf frame 100 to hold and display product.

Figure 20:
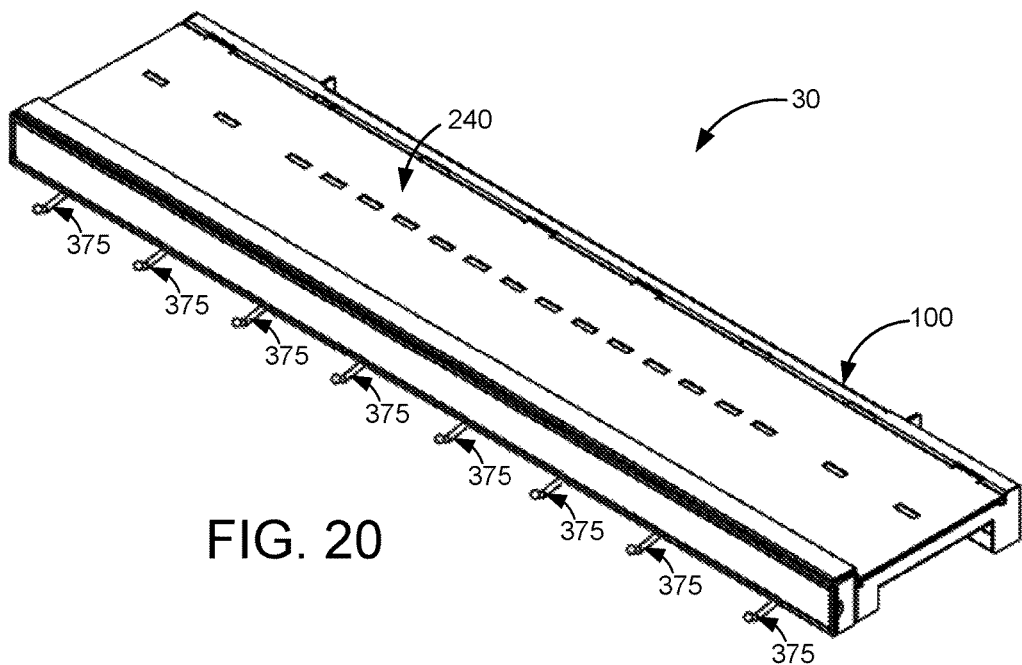
FIG. 20 is a perspective view of a modular shelf unit including the shelf frame of FIG. 1 with the shelf liner of FIG. 6 and the plurality of peg hooks of FIG. 13 according to an embodiment.
Figure 21:
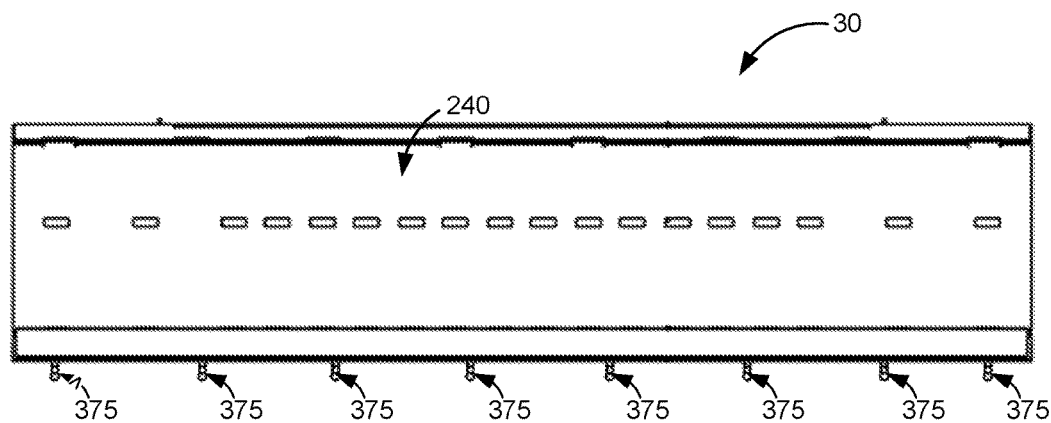
FIG. 21 is a top view of FIG. 20.
Figure 22:
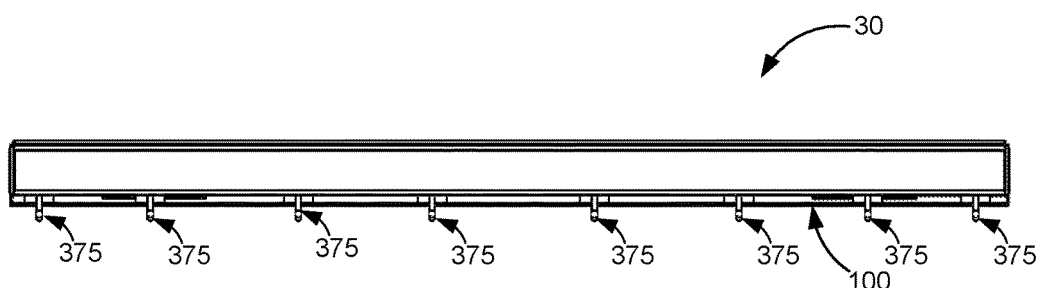
FIG. 22 is a front view of FIG. 20.
Figure 23:
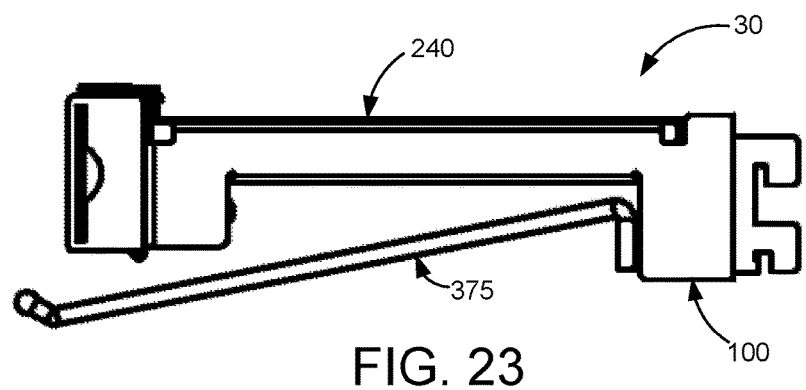
FIG. 23 is an enlarged right side view of FIG. 20.

FIG. 20 is a perspective view of a modular shelf unit 30 including shelf liner 240 and plurality of peg hooks 375 simultaneously mounted to shelf frame 100 according to an embodiment. FIG. 21 is a top view, FIG. 22 is a front view and FIG. 23 is an enlarged right side view of FIG. 20. The embodiment illustrated in FIGS. 20-23 illustrate how shelf frame 100 may be used to form modular shelf unit 30 with multiple different modular display components to display different types of retail products simultaneously. In this example, modular display unit 30 supports certain products that are configured to be supported by stems 376 of each peg hook 375 while also supporting certain products that may be supported by a shelf on full shelf liner 240.

Figure 24:
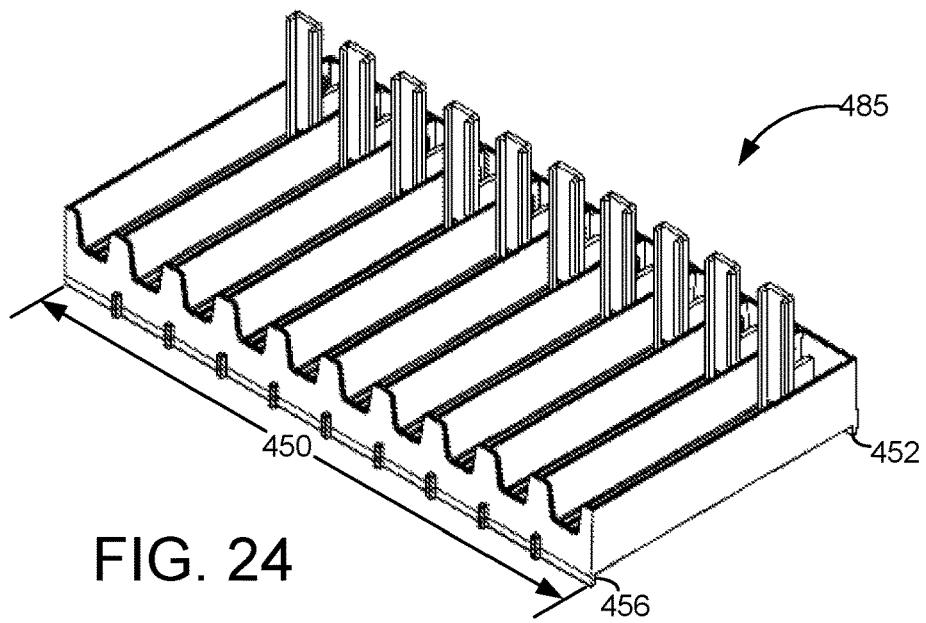
FIG. 24 is a perspective view of a pusher tray that may be used with the modular shelf unit of FIG. 1 according to an embodiment.
Figure 25:
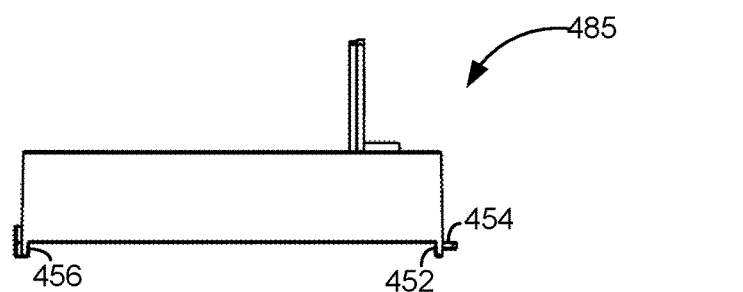
FIG. 25 is a side view of FIG. 24.
Figure 26:
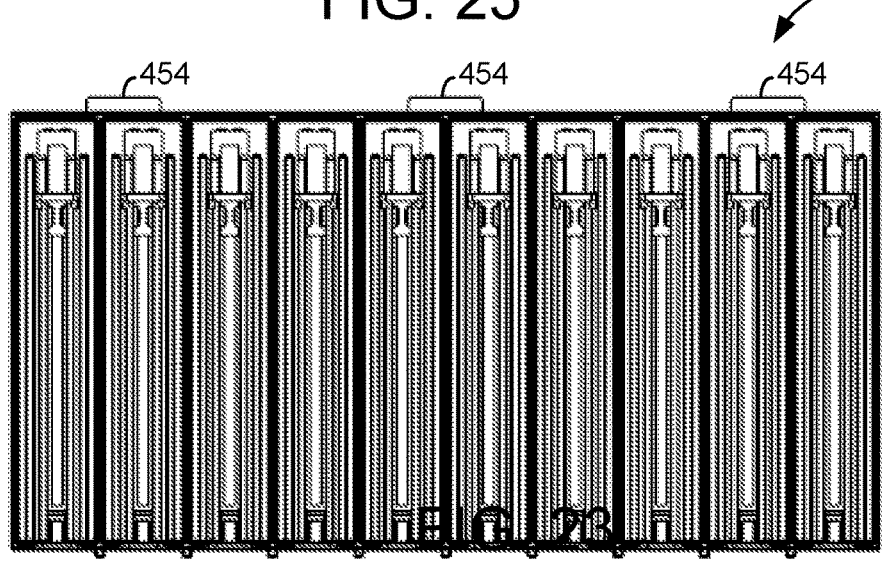
FIG. 26 is a top view of FIG. 24.

FIGS. 24-33 illustrate various modular display components including upper and lower modular display components that may be used with and supported by shelf frame 100. FIG. 24 is a perspective view, FIG. 25 is a side view and FIG. 26 is a top view of a pusher tray 485 according to an embodiment of modular display components. Pusher tray 485 has a width 450 that is less than width 150 of shelf frame 100 (FIG. 1) and less than width 250 of full shelf liner 240. Pusher tray 485 includes a downward depending lip 452 that extends the entirety of width 450 of the bottom, back edge of pusher tray 485, a plurality of outwardly extending flanges 454 that are spaced apart along width 450 of the back of pusher tray 485 and a downward depending lip 456 that extends the entirety of width 450 of the bottom, front edge of pusher tray 485.

In various embodiments of a modular shelf unit, one or more pusher trays 485 are upper modular display components and may be mounted to shelf frame 100 as follows. Each of the outwardly extending flanges 454 located along the back edge of pusher tray 485 are received by one of the notches 163 located along back wall 166 of back frame member 108 of shelf frame 100. Further, the downwardly depending lip 452 is positioned within upper facing rear channel 165. Still further, the downwardly depending lip 456 is positioned within upper facing front channel 170. In one embodiment, multiple pusher trays 485 are mounted across the entirety of width 150 of shelf frame 150 in place of shelf liner 240 with or without a plurality of peg hooks 375 supported on hang bar 180. In another embodiment, one or more pusher trays 485 are mounted to shelf frame 150 as discussed and do not fill up the entirety of space left by the removal of shelf liner 240. In the unused space, other types of upper modular display components may be used.

Figure 27:
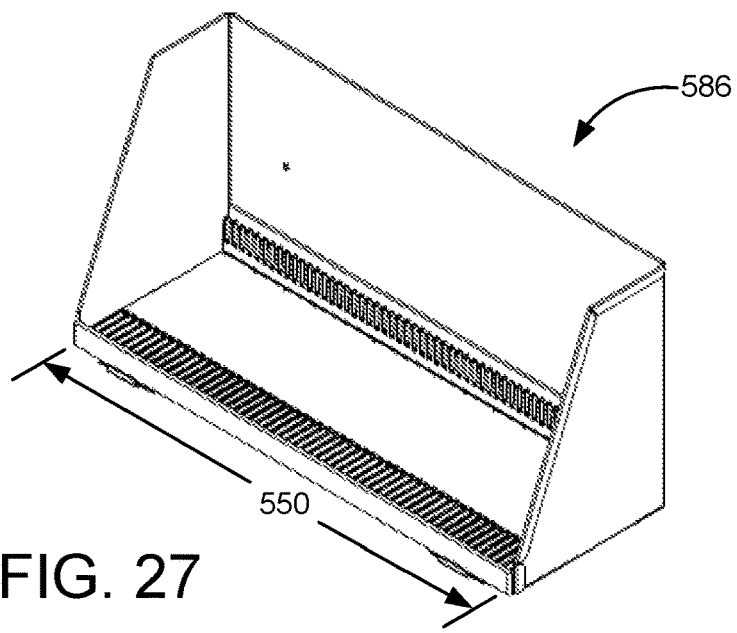
FIG. 27 is a perspective view of a cubby that may be used with the modular shelf unit of FIG. 1 according to an embodiment.
Figure 28:
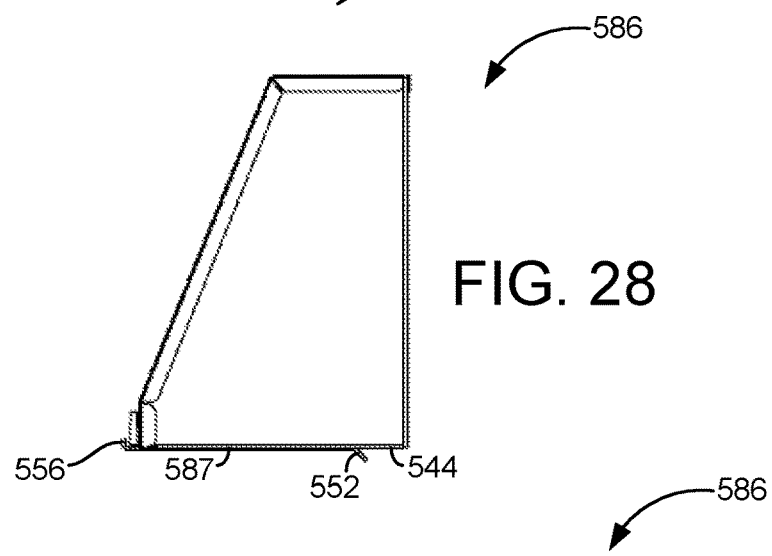
FIG. 28 is a side view of FIG. 27.
Figure 29:
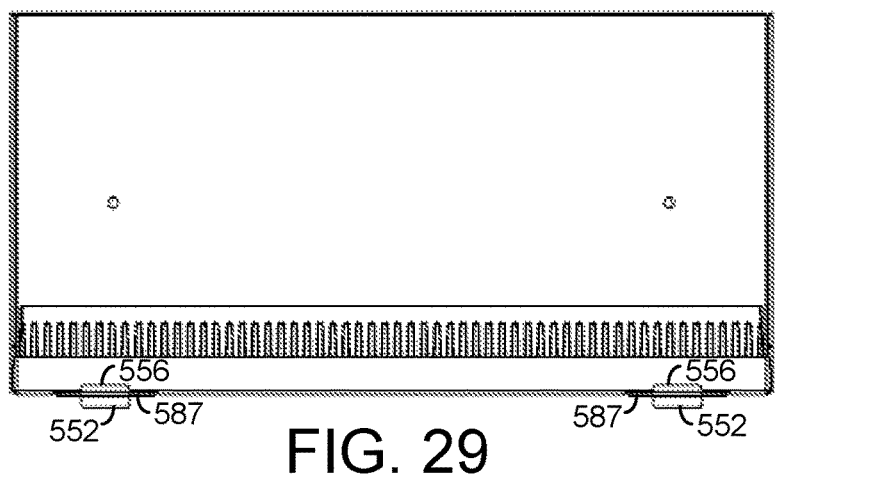
FIG. 29 is a front view of FIG. 27.

FIG. 27 is a perspective view, FIG. 28 is a side view and FIG. 29 is a front view of a cubby 586 according to an embodiment of modular display components. Although not illustrated, cubby 586 may include dividers that are inserted into the slots illustrated in the interior of cubby 586. Cubby 586 has a width 550 that is less than width 150 of shelf frame 100 (FIG. 1) and less than width 250 of full shelf liner 240. Cubby 586 includes a plurality of mounts 587 (In FIGS. 27-29, there are two) coupled to a bottom surface 544 of cubby 586. Each mount 587 includes a downwardly depending flange 552 located at the back end of each mount 587 and an upwardly depending flange 556 located at the front end of each mount 587. Upwardly depending flange 556 is positioned a distance in front of the front of cubby 586, but downwardly depending flange 556 is positioned a distance inwardly from the back wall of cubby 586.

In various embodiments of a modular shelf unit, one or more cubbies 586 are upper modular display components that are mounted to shelf frame 100 as follows. First, a shelf liner, such as full shelf liner 240, is mounted to shelf frame 100. Then, each of downwardly depending flanges 552 of each mount 587 is inserted into one of the plurality of slots 247 (FIG. 6) that extend between top surface 242 and bottom surface 244. Slots 247 are centrally located along a line of shelf liner 240. Further, the upwardly depending lip 556 is positioned with upwardly depending lips 256 of shelf liner 240 under the cantilevered wall 125 of front frame member 106. In one embodiment, multiple cubbies 586 are mounted across the entirety of width 150 of shelf frame 100 on top of shelf liner 240 with or without a plurality of peg hooks 375 supported on hang bar 180. In another embodiment, one or more cubbies 586 are mounted to shelf frame 100 and shelf liner 240 as discussed and do not fill up the entire width of shelf frame 100 or shelf liner 240. In the unused space, other types of modular display components may be used.

Figure 30:
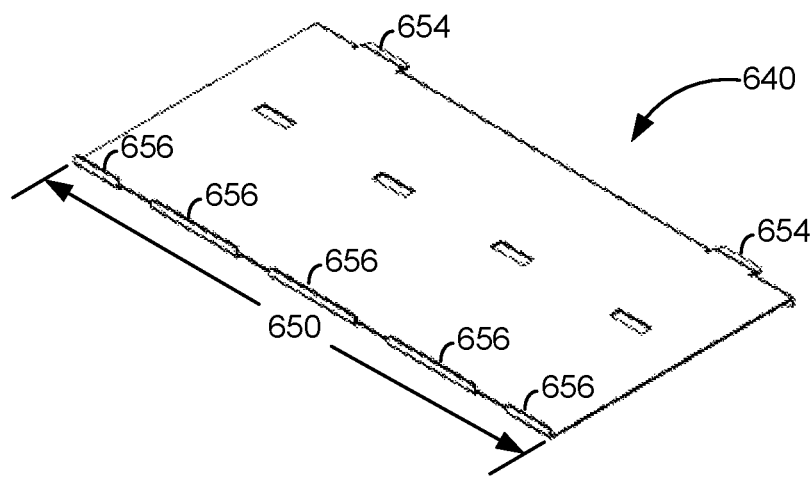
FIG. 30 is a perspective view of a half shelf liner that may be used with the modular shelf unit of FIG. 1 according to an embodiment of a modular shelf unit.
Figure 31:
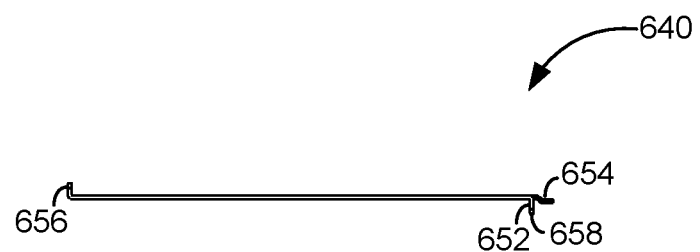
FIG. 31 is a side view of FIG. 30.

FIG. 30 is a perspective view and FIG. 31 is a side view of a half shelf liner 640 according to an embodiment of upper modular display components. Half shelf liner 640 has a width 650 that is less than width 150 of shelf frame 100 and less than width 250 of full shelf liner 240. Half shelf liner 640 is substantially similar to full shelf liner 240. Half shelf liner 640 is useful as a modular display component when, for example, a modular display component that does not need a shelf liner, such as pusher trays 485, is included on the same modular shelf unit as a modular display component that needs a shelf liner, such as cubbies 586. Half shelf liner 640 as a modular display component is mounted to shelf frame 100 as follows. Each of the two outwardly extending flanges 654 located along the back edge of shelf liner 640 are received by two of the notches 163 located along back wall 166 of back frame member 108 of shelf frame 100. Further, each of the downwardly depending lips 652 are positioned within upper facing rear channel 165 of shelf frame 100 such that terminating edge 658 of each downwardly depending lip 652 is in engagement with the bottom of upper facing rear channel 165. Still further, each of the upwardly depending lips 656 are positioned under the cantilevered wall 125 of front frame member 106 of shelf frame 100.

Figure 32:
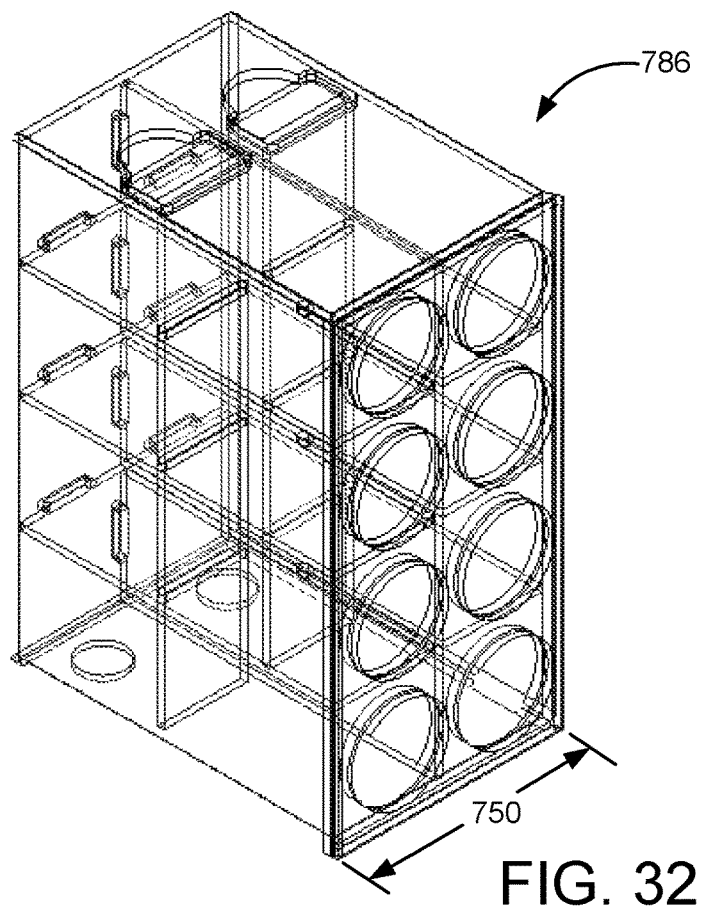
FIG. 32 is a perspective view of a cubby that may be used with the modular shelf unit of FIG. 1 according to an embodiment.

FIG. 32 is a perspective view of another embodiment of an upper modular display component that is a cubby 786 according to an embodiment. Cubby 786 has a width 750 that is less than width 150 of shelf frame 100 (FIG. 1) and less than width 250 of full shelf liner 240 and less than width 650 of half shelf liner 640. Cubby 786 can be used to display make up pencils and the like. In various embodiments of a modular shelf unit, one or more cubbies 786 are mounted to shelf frame 100 as follows. First, a shelf liner, such as full shelf liner 240 or half shelf liner 640, is mounted to shelf frame 100. Then, one or more cubbies are placed on the shelf liner. In one embodiment, multiple cubbies 786 are mounted across the entirety of width 150 of shelf frame 100 on top of shelf liner 240 or shelf liner 640 with or without a plurality of peg hooks 375 supported on hang bar 180. In another embodiment, one or more cubbies 786 are mounted to shelf frame 100 and shelf liner 240 or shelf liner 640 as discussed and do not fill up the entire width of shelf frame 100 or shelf liner 240 or shelf liner 640. In the unused space, other types of modular display components may be used.

Figure 33:
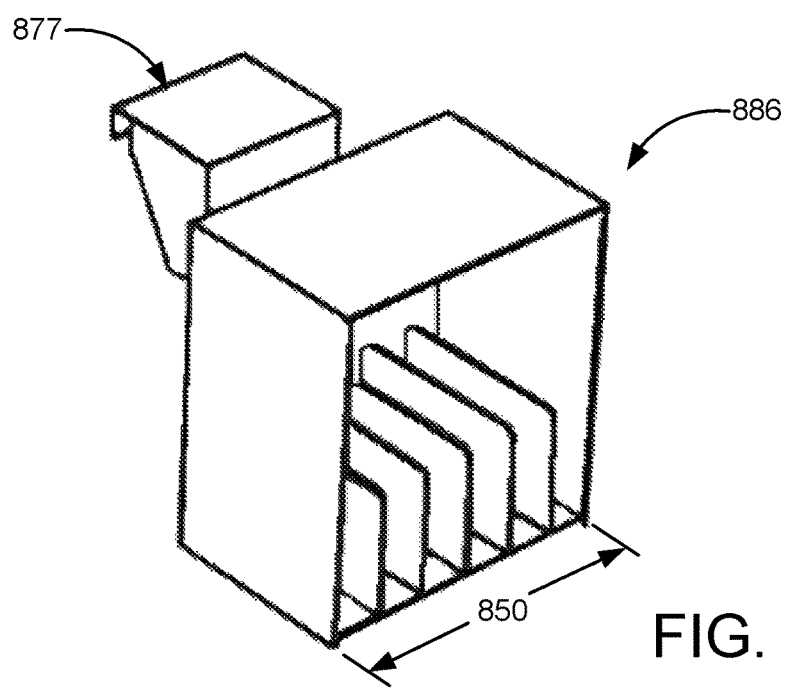
FIG. 33 is a perspective view of a hanging cubby that may be used with the modular shelf unit of FIG. 1 according to an embodiment.

FIG. 33 is a perspective view of yet another embodiment of a cubby 886 according to an embodiment. However, cubby 886 is a lower modular display component that is a hanging cubby. Cubby 886 has a width 850 that is less than width 150 of shelf frame 100 (FIG. 1) and less than width 250 of full shelf liner 240. Rather than cubby 886 being mounted or rested on a shelf liner, cubby 886 includes a bracket 877 much like bracket 377 of peg hook 375. In various embodiments of a modular shelf unit, one or more cubbies 886 are mounted to hang bar 180 as follows. Each bracket 877 of each hanging cubby 886 is slid onto hang bar 180 either at spaced apart distances or adjacent to each other. In particular, an interior front of bracket 877 is in contact with front wall 181 of hang bar 180, an interior back of bracket 877 is in contact with back wall 184 of hang bar 180 and an interior top of bracket 877 is in contact with upward facing wall 182 of hang bar 180. In this way, each hanging cubby 886 hangs downwardly from hang bar 180 and shelf frame 100 to hold and display product.

Figure 34:
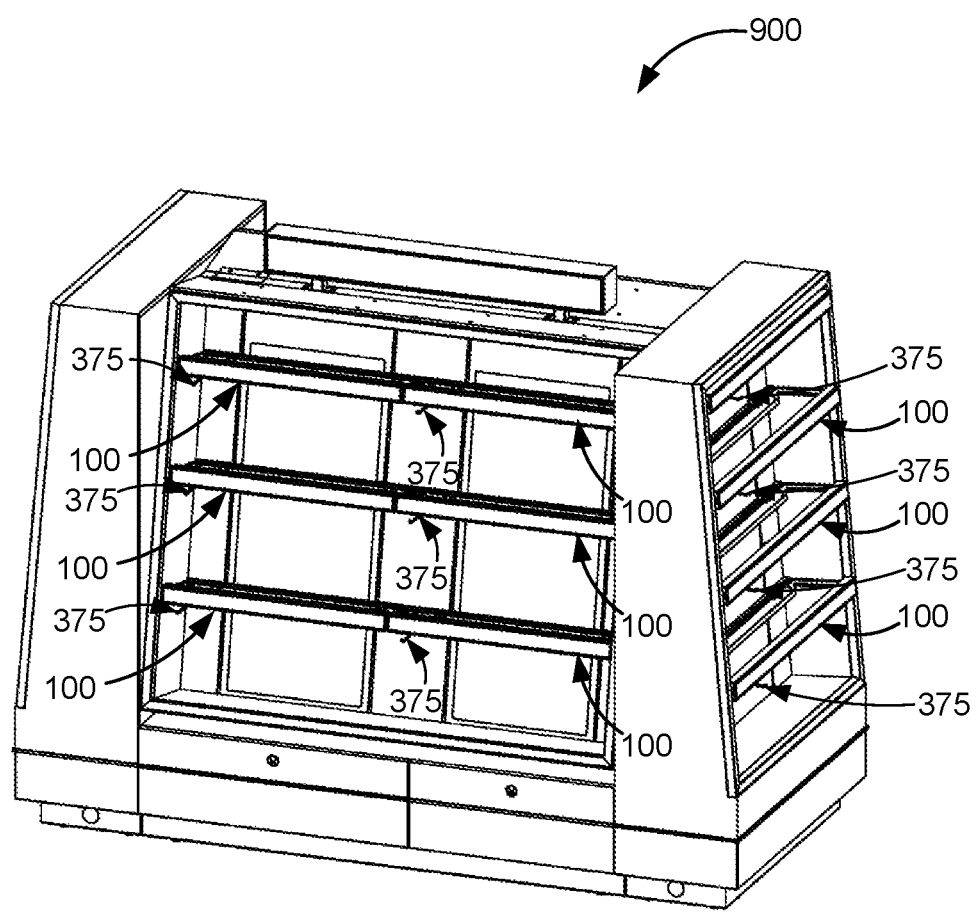
FIG. 34 is a perspective view of a modular shelf unit mounted to a display fixture.

FIG. 34 is a perspective view of a display fixture 900. Mounted to display fixture 900 are a plurality of shelf frames 100. Coupled to each shelf frame 100 is a single peg hook 375 so that each shelf frame forms a modular display unit. However, it should be realized that each shelf frame 100 mounted to display fixture 900 can include any of a combination of different modular display components as describe above so that display fixture 900 is capable of displaying all different types of products.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:
1. A modular shelf unit comprising:
a shelf frame including a front, a back and right and left sides;
a front panel rotatably coupled to the front of the shelf frame and configured to rotate about a rotational axis located proximate to a bottom edge of the front of the shelf frame, wherein the front panel includes at least one holder configured to hold sheet material and a plurality of lights located behind the at least one holder to illuminate the sheet material;
wherein when the front panel is configured into a rotatably opened position, the plurality of lights are turned off; and
wherein when the front is configured into a rotatably closed position, the plurality of lights are turned on.
2. The modular shelf unit of claim 1, wherein the front panel comprises a front exterior side, a back interior side and an upper facing side, the back interior side including at least one electrically conductive prong that mates with an electrical contact on the front facing side of the front of the shelf frame, wherein when the front panel is configured into a rotatably opened position, the at least one electrically conductive prong is uncoupled from the electrical contact and the plurality of lights in the front panel are turned off and wherein when the front panel is configured into a rotatably closed position, the at least one electrically conductive prong is coupled with the electrical contact and the plurality of lights in the front panel are turned on.
3. The modular shelf unit of claim 2, wherein the at least one holder configured to hold the sheet material comprises a first holder located on the front exterior side of the front panel and a second holder located on the upper facing side of the front panel.
4. The modular shelf unit of claim 1, wherein the front panel comprise at least two magnets attached to the back interior side, wherein the two magnets are magnetically coupled to the shelf frame when the front is configured into a rotatably closed position.
5. The modular shelf unit of claim 1, wherein the left and the right sides of the shelf frame comprise spaced apart side frame members and the front and the back comprise spaced apart front and back frame members, wherein the front frame member connects front ends of the side frame members and the back frame member connects back ends of the side frame members.

6. The modular shelf of claim 5, wherein the shelf frame comprises at least one receiving feature configured to receive a modular display component.

7. The modular shelf unit of claim 6, wherein at least one receiving feature comprises a hang bar that extends along at least a portion of a bottom interior of the back frame member and is configured to receive a lower modular display component.

8. The modular shelf unit of claim 6, wherein the at least one receiving feature comprises an upwardly facing channel that extends a width of the shelf frame and is configured to receive an upper modular display component.

9. The modular shelf unit of claim 6, wherein the at least one receiving feature comprises a plurality of notches spaced apart from each other along the back frame member and are configured to receive an upper modular display component.

10. A modular shelf unit comprising:
a shelf frame including spaced apart side frame members, a front frame member connecting front ends of the side frame members and a back frame member connecting back ends of the side frame members;
wherein the shelf frame includes a receiving feature comprising a hang bar that extends along at least a portion of a bottom interior of the back frame member and configured to receive a lower modular display component; and
wherein the shelf frame includes at least another receiving feature configured to receive an upper modular display component.

11. The modular shelf unit of claim 10, further comprising a front panel rotatably coupled to the front of the shelf frame and configured to rotate about a rotational axis located proximate to a bottom edge of the front frame member, wherein the front panel includes at least one holder configured to hold sheet material and a plurality of lights located behind the at least one holder to illuminate the sheet material.

12. The modular shelf unit of claim 11, wherein the front panel comprises a front exterior side, a back interior side and an upper facing side, the back interior side including at least one electrically conductive prong that mates with an electrical contact on a front exterior side of the front frame member, wherein when the front panel is configured into a rotatably opened position, the at least one electrically conductive prong is uncoupled from the electrical contact and the plurality of lights in the front panel are turned off and wherein when the front panel is configured into a rotatably closed position, the at least one electrically conductive prong is coupled with the electrical contact and the plurality of lights in the front panel are turned on.

13. The modular shelf unit of claim 12, wherein the at least one holder that is configured to hold sheet material comprises a first holder located on the front exterior side of the front panel and a second holder located on the upper facing side.

14. The modular shelf unit of claim 11, wherein the front panel comprise at least two magnets attached to a back interior side of the front panel, wherein the two magnets are magnetically coupled to the shelf frame when the front is configured into a rotatably closed position.

15. The modular shelf unit of claim 10, wherein the at least another receiving feature comprises an upwardly facing channel.

16. The modular shelf unit of claim 10, wherein the at least another receiving feature comprises a plurality of notches spaced apart from each other along the back frame member.

17. A method of applying a graphic or price label to a modular shelf unit comprising:
providing a shelf frame including a front, a back and right and left sides and a front panel rotatably coupled to the front of the shelf frame, wherein the front panel includes at least one holder configured to hold sheet material and lights located behind the at least one holder to illuminate the sheet material;
rotating the front panel of the shelf frame about a rotational axis located proximate to a bottom edge of the front of the shelf frame to open the front panel, wherein the plurality of lights turn off when the front panel is rotated away from the front of the shelf frame;
inserting sheet material in the at least one holder; and
rotating the front panel of the shelf frame to close the front panel, wherein the plurality of lights turn on when the front panel is rotated toward the front of the shelf frame.

18. The method of claim 17, wherein inserting sheet material in the at least one holder comprises inserting at least one graphic in a first holder located on a front exterior side of the front panel and inserting price labels into a second holder located on an upper side of the front panel.

19. The method of claim 17, wherein rotating the front panel of the shelf frame to open the front panel further comprises uncoupling at least one electrically conductive prong from an electrical contact on the front facing side of the front of the shelf frame so that the plurality of lights turn off.

20. The method of claim 19, wherein rotating the front panel of the shelf frame to close the front panel further comprises recoupling the at least one electrically conductive prong to the electrical contact on the front facing side of the front of the shelf frame so that the plurality of lights turn on.

* * * * *